(12) United States Patent
Junk (10) Patent No.: US 7,845,268 B2
(45) Date of Patent: *Dec. 7, 2010

(54) ASYMMETRIC VOLUME BOOSTER ARRANGEMENT FOR VALVE ACTUATORS

(75) Inventor: Kenneth W. Junk, Marshalltown, IA (US)

(73) Assignee: Fisher Controls International LLC, St. Louis, MO (US)

( * ) Notice: Subject to any disclaimer, the term of this patent is extended or adjusted under 35 U.S.C. 154(b) by 218 days.

This patent is subject to a terminal disclaimer.

(21) Appl. No.: 12/180,061

(22) Filed: Jul. 25, 2008

(65) Prior Publication Data

US 2008/0276798 A1 Nov. 13, 2008

(51) Int. Cl.
*F15B 13/042* (2006.01)
*F01L 31/00* (2006.01)

(52) U.S. Cl. .......................... 91/463; 91/274
(58) Field of Classification Search ............. 91/274, 91/450, 463, 465; 137/596.14
See application file for complete search history.

(56) References Cited

U.S. PATENT DOCUMENTS

| 3,692,054 | A | 9/1972 | Buls et al. |
| 4,813,339 | A | 3/1989 | Uno et al. |
| 6,003,428 | A | 12/1999 | Mundie et al. |

FOREIGN PATENT DOCUMENTS

| EP | 0 869 104 A1 | 10/1998 |
| JP | 47-3939 | 2/1972 |
| JP | 54-62526 | 5/1979 |

OTHER PUBLICATIONS

Office Action for Japanese Patent Application No. 2007-508522, dated Nov. 10, 2009.
Rudolph Muijtjens, "Praktisches Positionieren mit pneumatischen Linearantrieben," Olhydraulik and Pneumatik, (1998) No. 7., Mainz, DE.

(Continued)

*Primary Examiner*—Michael Leslie
(74) *Attorney, Agent, or Firm*—Marshall, Gerstein & Borun LLP (57) ABSTRACT

An asymmetric volume booster assembly includes an actuator movable in a first direction and a second direction, a first booster in fluid communication with the actuator, and a second booster in fluid communication with the actuator. The first booster includes a first supply passage and a first exhaust passage, wherein the first supply passage supplies fluid to the actuator and the first exhaust passage exhausts fluid from the actuator. The first exhaust passage is configured to produce a first fluid flow resistance. The second booster includes a second supply passage and a second exhaust passage, wherein the second supply passage supplies fluid to the actuator and the second exhaust passage exhausts fluid from the actuator. The second exhaust passage is configured to produce a second resistance to fluid flow. The first fluid flow resistance is greater than the second fluid flow resistance, such that the actuator moves substantially symmetrically in the first direction and the second direction.

11 Claims, 6 Drawing Sheets

OTHER PUBLICATIONS

English Translation cited DE reference. Rudolph Muijtjens, "Practical positioning with pneumatic linear drives," 3031 oil hydraulics and pneumatics (1998) No. 7, Mainz, DE.

Instruction Manual, Form 5122, Aug. 2003, Type 2625 and 2625NS Volume Boosters.

International Search Report and The Written Opinion for International Application No. PCT/US2005/012646, dated Aug. 4, 2005.

Jack L. Johnson, "Matching Valve and Cylinder Asymmetry," Hydraulics and Pneumatics (2003).

Jack L. Johnson, P.E., "The final word on non-symmetrical valves," Hydraulics * Pneumatics, Oct. 2003.

FIG. 10

ASYMMETRIC VOLUME BOOSTER ARRANGEMENT FOR VALVE ACTUATORS

FIELD OF THE INVENTION

The present invention relates generally to control valve systems and, more specifically, to a volume booster arrangement with an asymmetric flow pattern for use with a valve actuator of a control valve.

BACKGROUND OF THE INVENTION

Valve systems for controlling the flow of liquids and/or gases, such as compressed air, natural gas, oil, propane, or the like, in a process system are generally known in the art. These systems can employ control valves to prevent or inhibit pressure surges within the fluids that can otherwise cause damage to components or disrupt system function.

In one application, a compressor increases the pressure of air flowing in the process system under normal operating conditions. If demand decreases, such as when a downstream throttling valve is closed, the need for a portion of the air decreases rapidly, and the flow through the compressor decreases. When the flow decreases enough, the compressor enters an unstable condition in which gas flows backwards through the compressor from the outlet side to the inlet side. At this point, the flow of gas oscillates rapidly between forward flow and reverse flow. This phenomenon is known as surge and is undesirable because it puts undue stress on the compressor components, such as blades and bearings.

Surge is generally addressed by the placement of a control valve around the compressor that diverts flow from the outlet of the compressor to the inlet when the compressor is near an operating point at which surge occurs. A control valve must act quickly because surge is a fast, unstable flow phenomenon. Traditionally, control valves have been on/off devices. However, with the advances in automation software and electronics as well as increased compressor sizes, significant improvements in operating efficiency and reliability can be attained if the control valve is instead a throttling device. To fully realize the benefits of a throttling valve instead of an on/off valve and to protect the compressor against surge, the position of the valve must be controlled both quickly and accurately.

The position of the control valve is normally controlled by a positioner. Large volume actuators can take 10 or 20 seconds or more to open or close the control valve with a standard positioner. Such a valve positioner cannot operate at, or deliver adequate volumes of fluid for moving the actuator at, the desired response times for optimal antisurge.

To address this problem, a control valve assembly can incorporate volume boosters in conjunction with the positioner on a throttling control valve to increase the stroking speed of the actuator. Valve and actuator stroke speed can be amplified or increased 15 or 20 times utilizing one or more volume boosters.

While the use of volume boosters reduces the problem of slow response time, it exacerbates any asymmetric performance of the valve in response to the positioner. Asymmetry is where, for example, the actuator is under-damped (or overshoots) in the closing direction and is over-damped (or sluggish) in the opening direction. Volume boosters not only amplify actuator response or stroke, but also amplify the inherent asymmetry. Such asymmetry is particularly noticeable on larger volume actuators equipped with volume boosters.

In general, the positioner and valve system are generally operated with a low voltage electrical system. The positioner converts an electrical signal, such as 4 mA-20 mA, to a pressure output to signal the actuator. Due to the low current flow under which the positioner operates and internal characteristics of the positioner, the signal delivered by the positioner to close the control valve is sent faster than the signal to open the valve. Thus, there is an inherent asymmetry in the performance of the positioner. The use of boosters only exacerbates this problem.

Generally, in compressor antisurge valve applications, the control valve assembly is equipped with long-stroke actuators and an equal number of volume boosters on the top side and the bottom side (top and bottom ports or chambers, respectively) of the actuator. In one example, due to the inherent asymmetry of the positioner and the multiple volume boosters, the actuator response will be under-damped in the opening direction and over-damped in the closing direction. In a fail-open actuator, i.e. where the actuator opens upon a surge condition, overshoot in the closing direction may not be particularly desirable in many circumstances. For example, in a compressor antisurge application, overshoot in the closing direction can accidentally send a valve into a surge condition by closing the throttling valve too far or too fast or both. It is known to those having ordinary skill in the art that generally, the deleterious effects of the under-damped response are reduced by detuning the positioner so that the response in the closing direction is critically damped. However, this detuning results in a substantially over-damped response in the opening direction that creates a very sluggish response and is objectionable.

In general, control valve assembly performance is improved if the actuator operates with dynamic symmetry. For example, an actuator operates with dynamic symmetry if the dynamic response in the opening direction of the valve is substantially the same as the dynamic response in the closing direction.

Accordingly, continual improvements in the construction and/or operation of control valve systems and their associated components are desirable.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the invention as defined by the appended claims.

DETAILED DESCRIPTION

The embodiments described herein are not intended to be exhaustive or to limit the scope of the invention to the precise form or forms disclosed. Instead, the following embodiments have been described in order to best explain the principles of the invention and to enable others skilled in the art to follow its teachings.

Figure 1:
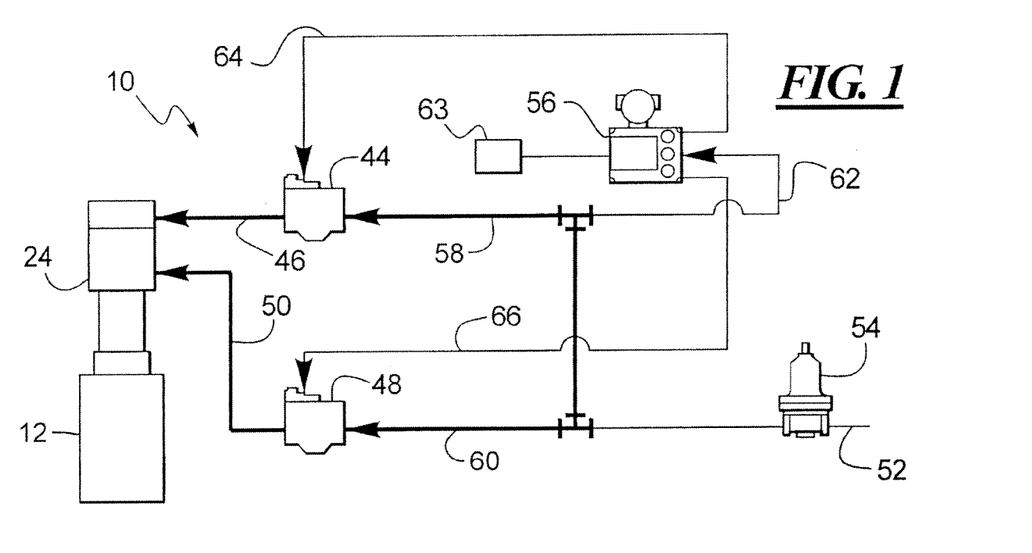
FIG. 1 shows a schematic of one example of a fail-open control valve assembly constructed in accordance with the teachings of the present invention and employing a piston-type valve actuator.

Referring now to the drawings, FIG. 1 illustrates one of many possible examples of a control valve assembly 10 using a booster arrangement constructed in accordance with the teachings of the present invention. FIGS. 1 and particularly 2 show a valve 12 that defines a passage 14 through which fluid flows. The valve 12 includes a valve plug 16 movably disposed in a cage 18 within the valve 12. The cage 18 is perforated such that fluid can pass through the cage 18. The plug 16 is connected to a stem 20, and is moveable between a first position shown in FIG. 2 in which the passage 14 is open and fluid can flow through the perforations in the cage 18, and a second position in which the plug 16 is moved downward and blocks the perforations in the cage 18 such that fluid cannot flow through the passage 14. Further, the valve 12 acts as a throttling valve so that the plug 16 can be located anywhere in between the first and second positions to control fluid flow through the valve 12.

Figure 2:
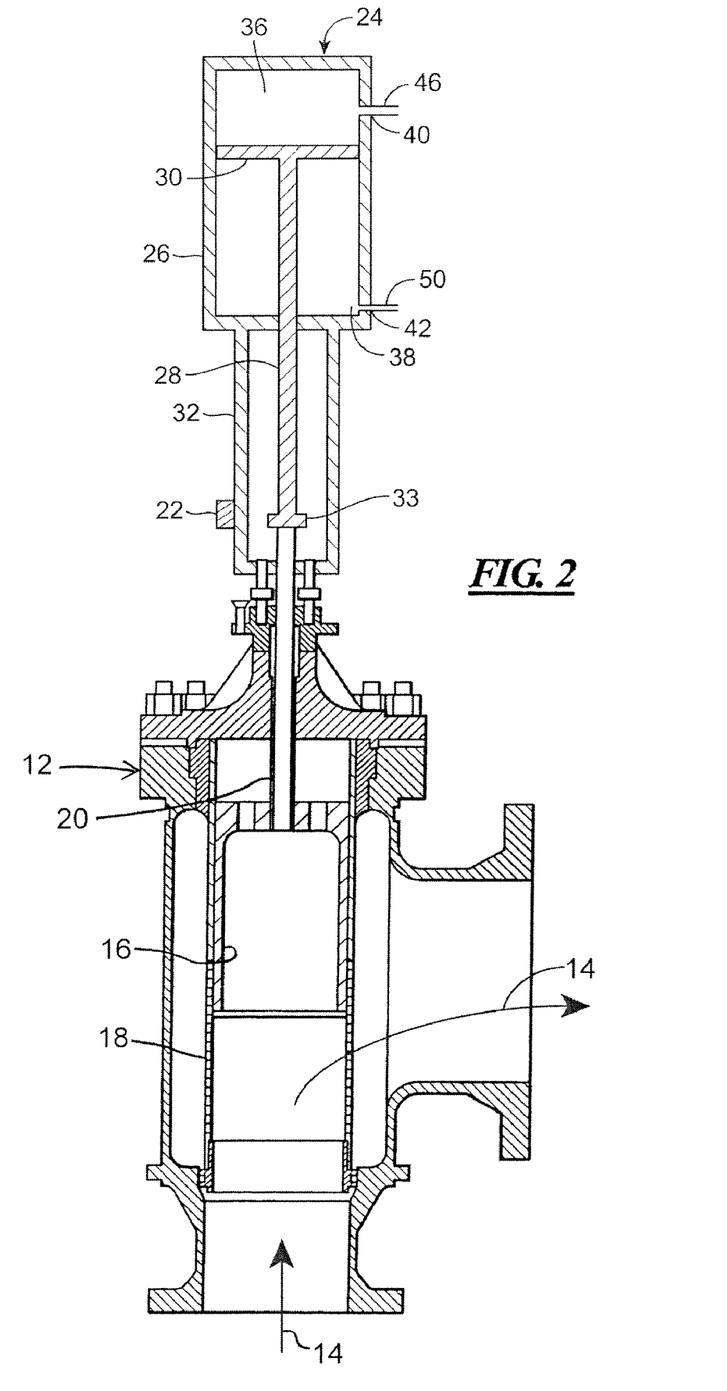
FIG. 2 shows a detailed view, partially in cross section, of the actuator and valve of FIG. 1.

An actuator 24 is disposed adjacent the valve 12 and is configured to move the valve 12 between the first and second positions. The actuator 24 includes a cylinder 26 in which a piston rod 28 slides. The piston rod 28 includes a piston 30 and an actuator yoke 32. The yoke 32 is operatively connected to the stem 20 via a stem connector 33, such that when the piston 30 moves, the plug 16 likewise moves. A control element 22 is disposed adjacent the stem connector 33 and can sense the position of the plug 16.

The piston 30 slides within a chamber 34 of the cylinder 26. The piston 30 divides the chamber 34 into an upper chamber 36 and a lower chamber 38 that are generally sealed from each other by the piston 30. A first port 40 allows the introduction of a fluid into the upper chamber 36 and a second port 42 allows the introduction of a fluid into the lower chamber 38.

As is known, to close the passage 14 with the valve 12, pressurized fluid can be introduced into the upper chamber 36 through the first port 40, and fluid in the lower chamber 38 can be released through the second port 42. The piston 28 and plug 16 are then forced downward, closing the passage 14. To open the passage 14, pressurized fluid is introduced into the lower chamber 38 through the second port 42, and the fluid in the upper chamber 36 can be released through the first port 40. The piston 28 and plug 16 are forced upward, opening the passage 14.

The upper chamber 36 is in fluid connection with a first booster 44 via a first connection 46. The lower chamber 38 is in fluid connection with a second booster 48 via a second connection 50. Accordingly, fluid supplied by the first booster 44 travels through the first connection 46 and the first port 40 and into the upper chamber 36. Likewise, fluid supplied by the second booster 48 travels through the second connection 50 and the second port 42 into the lower chamber 38. In this example, the first and second connections 46, 50 are made of a pipe nipple, but other types of connections, such as flexible or rigid plastic, can be used. In this disclosure, the term fluid is used in the engineering sense, and can include at least liquids and gases.

Referring back to FIG. 1, a main supply line 52 is connected to a regulator 54 and supplies the regulator 54 with pressurized fluid from a pressure source such as an air compressor. The regulator 54 is in fluid connection with and supplies pressurized fluid to the first booster 44, the second booster 48, and a positioner 56 via a first booster supply line 58, a second booster supply line 60, and a positioner supply line 62, respectively. Again, these supply lines can be made of metal tubing, rigid or flexible plastic tubing, or the like. The regulator 54 can regulate the pressure of the fluid supplied to these components.

The positioner 56 is in electrical communication with an input center 63. The positioner 56 receives commands from the input center 63 directing it to move the valve 12 to a desired position, i.e., the closed position, the open position, or anywhere in between. The positioner 56 can be in electrical communication with the control element 22, and is thus able to determine the position of the plug 16 within the valve 12. The positioner 56, selectively using the first and second boosters 44, 48, directs the movement of the valve 12 in a manner discussed herein.

The positioner 56 is in fluid communication with the first booster 44 via a first positioner output line 64, and is in fluid communication with the second booster 48 via a second positioner output line 66. The positioner 56 receives the electrical command input from the input center 63 and converts this electrical signal to pneumatic signals. The positioner 56 uses the pressurized fluid from the regulator 54 to deliver the first pneumatic signal through the first output line 64 to the first booster 44 and the second pneumatic signal through the second output line 66 to the second booster 48.

If the command input directs the positioner 56 to open the valve 12 in a non-urgent manner, the positioner 56 supplies pressurized fluid through the second booster 48 to the lower chamber 38 of the acutuator 24, and the positioner 56 allows pressurized fluid to flow from the upper chamber 36, through the first booster 44, to be discharged to the atmosphere or a third reservoir. If the command input directs the valve to close, the reverse occurs.

As is known in the art, if the signal from the input center directs the positioner 56 to rapidly open the valve 12 under a surge condition, the second pneumatic signal flows through the second booster 48 to the lower chamber 38. The second signal also activates the second booster 48 as will be described herein such that a large volume of pressurized fluid flows through the second booster supply line 60 through the second booster 48 to the lower chamber 38, thereby rapidly opening the valve 12.

As detailed herein, the disclosed first and second volume boosters 44, 48 include a feature that can be employed in a booster arrangement to alleviate or eliminate the aforementioned dynamic asymmetries. The boosters 44, 48 can be arranged with other volume boosters to incorporate a functional asymmetry into the valve system to compensate or counteract the dynamic asymmetry as described below to create a system with virtually symmetrical performance.

Figure 3:
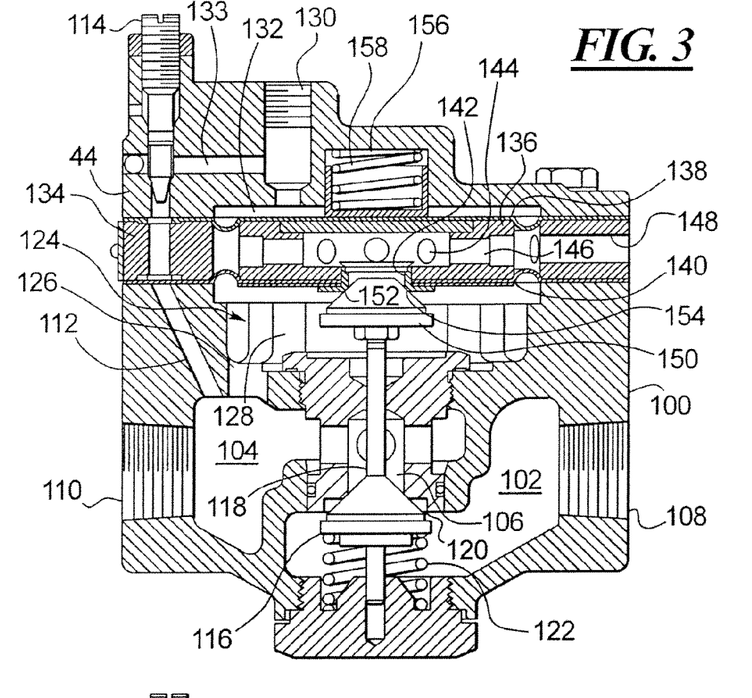
FIG. 3 shows a cross section view of the first volume booster illustrated in FIG. 1.
Figure 4:
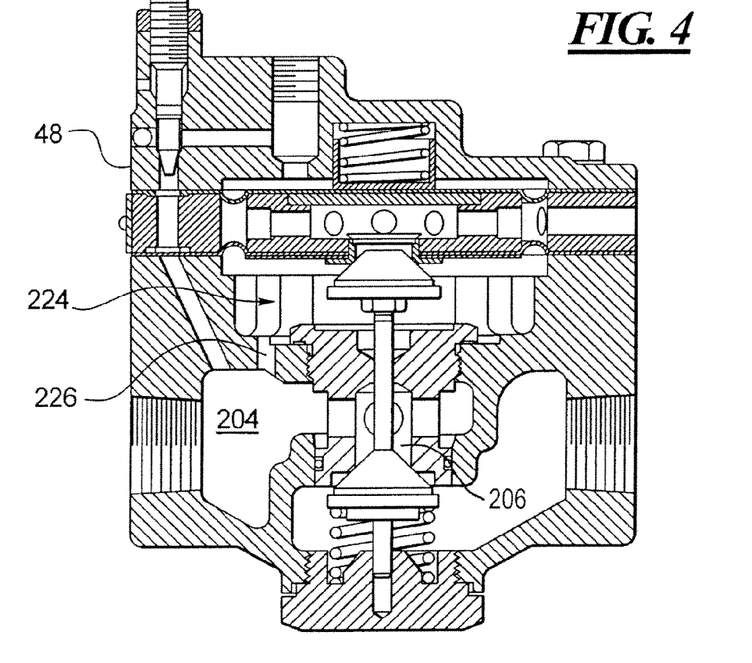
FIG. 4 shows a cross section view of the second volume booster illustrated in FIG. 1.

The first volume booster 44 disclosed herein is shown in cross section in FIG. 3 and the second volume booster 48 is shown in cross section in FIG. 4. The first booster 44 generally includes a casing or body 100 having an inlet or supply chamber 102 and an output chamber 104 in communication with one another via a supply port 106 within the body 100. The supply chamber 102 has a supply opening 108 at one end that is open to the exterior of the body 100. The supply chamber 102 is in communication with the supply port 106 at its interior end. The output chamber 104 communicates with the supply port 106 at an interior end of the output chamber 104 and opens to the exterior of the body 100 at an output opening 110. The supply chamber 102 and supply opening 108 are in communication with the regulator 54 in the above example via the first booster supply line 58. The output chamber 104 is in communication with an actuator, such as the actuator 24 discussed above, via the first connection 46.

A bypass restriction passage 112 is in communication with the output passage 104 and has an adjustment screw 114. The bypass adjustment screw 114 can be adjusted to permit small volumes of fluid to travel from the positioner 56, through the first booster 44, and to the upper chamber 34 of the actuator 24, as discussed below, while avoiding implementation of the volume boost function. A larger pressure differential across the first booster 44 will actuate the booster as discussed below.

A supply valve 116 is positioned within the supply chamber 102 adjacent the supply port 106. The supply valve 116 is carried in this example integrally on a portion of a stem 118 and is biased relatively tightly to a closed position against a seat 120 of the supply port 106 by a spring 122. The spring 122 is simply a safety feature to assure the supply valve 116 remains closed when the booster is not operating or if a valve system failure were to occur.

A cavity 124 is provided within the body above the chambers 102 and 104 and the supply port 106 in this example. A first exhaust port 126 is provided in communication between an exhaust chamber section 128 of the cavity 124 and the output chamber 104 downstream of the supply port 106. An input signal port 130 is in fluid communication between the first booster supply line 58 from the positioner 56 and an upper signal chamber section 132 of the cavity 124.

A bypass port 133 provides fluid communication between the bypass passage 112 and the input signal port 130. When the positioner sends pressurized fluid to the first booster through the input signal port 130 to close the valve 12, the fluid travels into the upper signal chamber 132 and through the bypass port 133. If the pressure of the fluid is not high enough to activate the first booster 44, as will be described herein, the fluid travels through the bypass port 133 and the bypass restriction passage 112, and into the output chamber 104. From there the fluid travels to the actuator 24 to close the valve 12. Of course, since the first booster 44 has not been activated, the closing of the valve 12 takes a comparatively long time.

A floating diaphragm assembly 134 is positioned within the cavity 124 and separates the cavity 124 into the exhaust and signal chambers 128 and 132, respectively, and functions as a poppet valve. The diaphragm assembly 134 includes a floating manifold 136 sandwiched between a pair of diaphragms 138 and 140. The upper diaphragm 138 is called an instrument diaphragm and defines the signal chamber 132. The lower diaphragm 140 is called a feedback diaphragm and defines the exhaust chamber 128. The manifold 136 includes a central opening 142 and a plurality of radial passages 144 extending radially outward therefrom. The radial passages 144 are in fluid communication with an annular passage 146 extending around the manifold 136 between the diaphragms 138 and 140. The annular passage 146 is in further fluid communication with an exhaust outlet 148 venting to atmosphere outside the body 100.

An exhaust valve 150 is carried on the valve stem 118 opposite the supply valve 116. A second exhaust port 152 is provided in the bottom of the manifold 136 and provides communication between the exhaust chamber 128 and the central opening 142 of the manifold 136. The exhaust valve 150 bears against a seat 154 to close off the second exhaust port 152. A spring cavity 156 is provided above the diaphragm assembly 134 and houses a spring 158 that biases the floating assembly 134 downward against the exhaust valve 150 to close the second exhaust port 152. When the exhaust valve 150 is closed, the exhaust chamber 128 is not in communication with the exhaust outlet 148. When open, the outlet chamber 104 of the booster is in fluid communication with the exhaust outlet 148 through the exhaust chamber 128 and diaphragm manifold 136.

Referring now to FIG. 4, the second booster 48 is depicted. In this example, the second booster 48 is identical to the first booster 44 except for those differences noted herein. The second booster 48 includes an output chamber 204 and a cavity 224 above the output chamber 204. The cavity 224 and the output chamber 204 are connected by a first exhaust port 226. In the second booster 48, the cross sectional area of the first exhaust port 226 is smaller than the cross sectional area of the first exhaust port 126 of the first booster 44. As will be seen, the resistance to flow of the exhaust through the first booster 44 is less than the resistance to flow of the exhaust through the second booster 48.

As discussed above and referring back to the first booster 44 by way of example, the positioner 56 delivers a pneumatic signal converted from electrical impulses based on the position of the actuator 24. The pressure signal is delivered to the signal port 130 and, thus, to the signal chamber 132 of the booster. Further, a steady supply pressure is provided to the supply chamber 102 by the regulator 28. The output chamber 104 is connected to the actuator 24.

A pressure differential across the first booster 44 occurs between the signal chamber 132 and the exhaust chamber 128 and thus the output chamber 104 (via the first exhaust port 126). If the pressure differential across the booster 22 is insubstantial, as determined by the booster bypass adjustment and as desired, each valve 116 and 150 remains closed. The diaphragm assembly 134 will be in a static unloaded position with each valve 116 and 150 born against its respective seat 120 and 154. The respective springs 122 and 158 assist in biasing the valves 116, 150 closed in an insubstantial or zero differential condition. A substantial pressure differential is one that is great enough to affect the diaphragm assembly 134, whether up or down, and will move the supply valve 116 and exhaust valve 150 in unison because each is fixed to the stem 118.

During operation, a positive differential condition is achieved when pressure is substantially greater in the signal chamber 132 than the output chamber 104. The positioner 56 delivers a high pressure signal to the signal port 130. The floating diaphragm assembly 134 is forced downward by the pressure differential upon the exhaust valve 150, keeping the second exhaust port 152 closed and opening the supply valve 116. Thus, the first booster 44 provides a volume of pressurized air to the actuator 24 from the supply chamber 102 via the output chamber 104. The output of the booster 44 is also registered on the diaphragm assembly 134 through the exhaust port 126. When the pressure in the output chamber 104 rises to the pressure in the signal chamber 132, the supply valve 116 rises up and closes off.

When pressure is substantially lower in the signal chamber 132 than the output chamber 104, a negative pressure differential is achieved. For example, the positioner 56 may issue a corrective pneumatic input signal to the signal port 130 that is at a relatively low pressure. The floating diaphragm assembly 134 and valve stem 118 will rise. The supply valve 116, if not already closed, will close off the supply port 106. Once closed, the stem 118 and valves 116 and 150 will not move further upward. Back pressure from the output chamber 104 moves the floating diaphragm assembly 134 further upward against the force of the spring 158 and opens the second exhaust port 152. Air in this example will vent to atmosphere from the output chamber 104 through the exhaust outlet 148.

The adjustment screw 114 can be adjusted to restrict the bypass so that different pressures from the positioner will activate the booster. For example, if the screw 114 nearly completely blocks the bypass, a small pressure from the positioner will activate the booster, as all the pressure will bear on the upper diaphragm 138 and force the supply valve 116 downward. Likewise, if the screw 114 allows a high pressure to flow through the bypass, less pressure will bear on the upper diaphragm 138, and the booster will only be activated under a comparatively higher pressure from the positioner.

In volume boosters of this type, the exhaust volume is limited by the size of the first exhaust ports 126, 226, which are the narrowest or smallest sized passages, ports, or cavities along the exhaust path. According to the present invention, asymmetry in actuator dynamics has been reduced or substantially eliminated by creating an asymmetry in the booster exhaust volume. This is achieved by the first exhaust port 126 of the first booster 44 being larger than the first exhaust port 226 of the second booster 48. Thus, the fluid flow resistance is greater in the second booster 48 than the first booster 44. In one example, the second booster 48 can be converted into the first booster 44 by milling or using another method to enlarge the size of the exhaust port 226. In this manner, asymmetry in booster exhaust volume is achieved.

When the lower chamber 38 of the actuator 24 is filled to open the passage 18, the second booster 48 can be employed to boost the stroke speed to a greater degree. The first booster 44 has a larger first exhaust port 126 to provide a greater exhaust volume capacity for the release of the air within the upper chamber 36. This can reduce damping during the opening of the valve. The amount of damping can be controlled by both the number of boosters assisting the actuator side, as well as the size difference between the exhaust ports 126, 226 of the boosters 44 and 48.

When the upper chamber 36 of the actuator 24 is filled to close the passage 18, the first booster 44 can be employed to boost the stroke speed, but to a lesser degree. The second booster 48 provides a lesser capacity for volume exhaust, and thus a slightly greater damping effect during the closing stroke than the first booster 44 provides during the opening stroke.

The difference in size of the booster exhaust ports 126 and 226 can be employed to counteract the inherent asymmetrical dynamics created in large volume actuators and valve systems. Thus, when a system has an asymmetrical performance in which the closing stroke is faster than the opening stroke, the first and second boosters 44, 48 can be used to increase the exhaust in the opening stroke such that symmetrical performance can be achieved.

The actuator as disclosed in this example need not be of a piston type, but can be virtually any type of actuator. For example, the actuator can be a spring and diaphragm type actuator. Further, the system can employ multiple volume boosters for each side of the actuator, if desired. It may be preferable to employ the same number of boosters on each side of the actuator to create near symmetry in boost and dynamic performance during each stroke. The asymmetrical booster exhaust size as disclosed herein can be employed in one or more of the boosters on either side of the actuator to achieve the desired amount of compensation for the asymmetric dynamics. Further, other structures can be employed to provide an asymmetric functionality of the boosters 44, 48 to counteract the asymmetric performance. This can include any structure that creates different flow resistance such as using the same boosters, but placing a regulator on one side to restrict exhaust, or any other structure, internal or external to the boosters themselves that affect the flow resistance of the supply or exhaust.

In the example shown, the first exhaust port 126 and the second exhaust port 226 are shown as having a circular cross section and cylindrical with the first exhaust port 126 having a larger diameter than the second exhaust port 226. In this manner, the resistance to fluid flow is greater in the second booster 48 than in the first booster 44. However, it will be seen that any number of constructions can be created to increase or decrease fluid flow. These include placing an obstruction in the path of an exhaust port such as a tab, a block, a bar, a vent, a fan, or the like. The second exhaust port 226 could also include irregular edges to increase the resistance to fluid flow. This can include threading the hole, creating a polygonal cross section or the like. Other obstructions and irregularly shaped sidewalls will be known by those of ordinary skill in the art.

Figure 5:
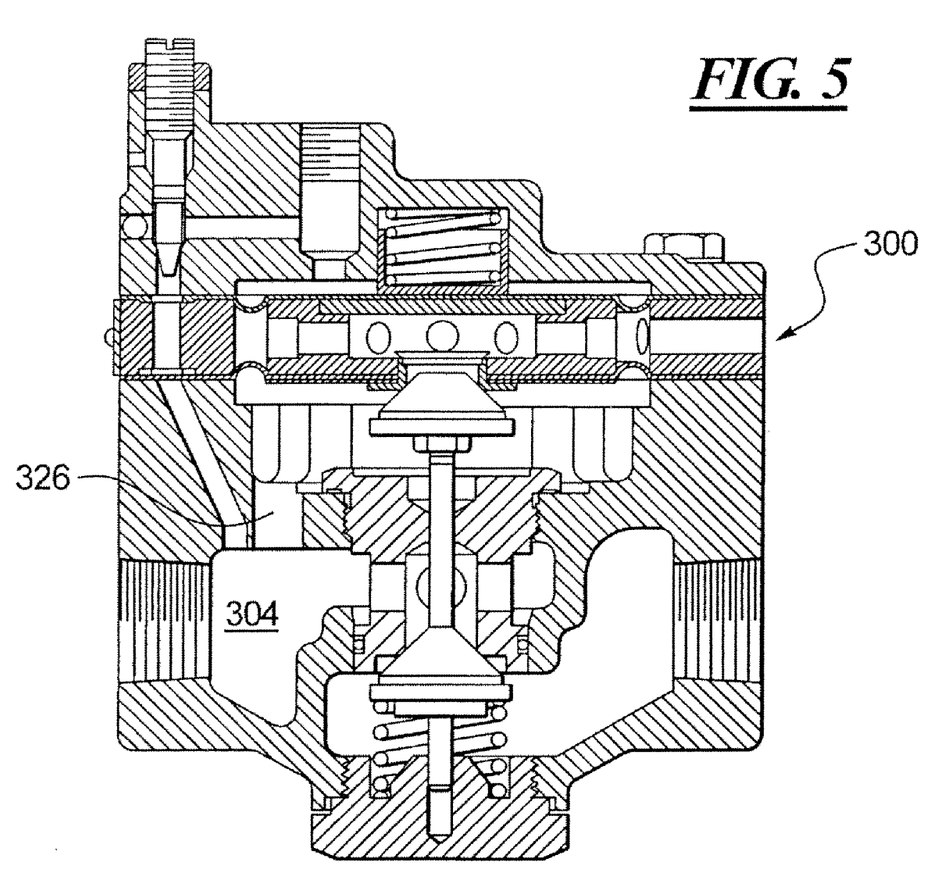
FIG. 5 shows a cross section view of an alternate example of the second volume booster illustrated in FIG. 2.

In an alternate embodiment of the second booster 48, a third booster 300 is depicted in FIG. 5 showing another manner of increasing the fluid flow resistance. The third booster 300 includes a third exhaust port 326 that is longer in length than the first exhaust port 126. The first exhaust port 126 and the third exhaust port 326 are each circular in cross section with the same diameter, however the length of the third exhaust port 326 is longer than the length of first exhaust port 126. To increase the resistance further, the third exhaust port 326 could have a curved or serpentine design. In this example the volume of a third output chamber 304 is decreased, but other designs can be made that do not decrease the volume of the third output chamber 304. In general, any design that restricts the exhaust fluid flow through the second booster 48 (or third booster 300) relative to the first booster 44 is appropriate.

Figure 6:
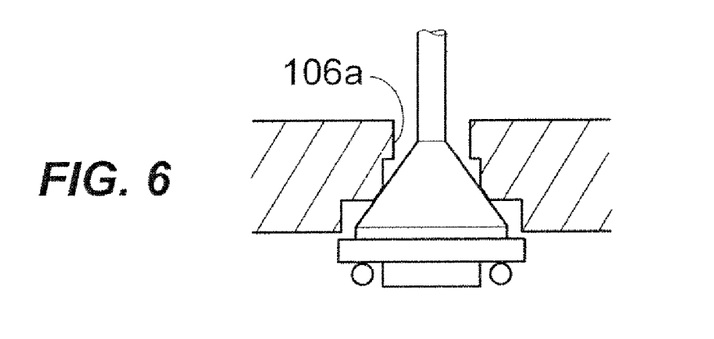
FIG. 6 shows an alternate construction of the supply port of the first booster.

In another example, shown in FIG. 6, instead of restricting the exhaust path to create an asymmetry, the resistance to airflow in the supply paths of the two boosters can be asymmetric. To this end, the cross section of the supply port 106a in the first booster 44 can be smaller than the supply port 206 of the second booster 48. In this example, the inherent asymmetry is counteracted by supplying fluid to the actuator 24 at a greater mass flow rate through the second booster than the first. Of course, the exhaust ports can also be manipulated in addition to the supply ports.

Figure 7:
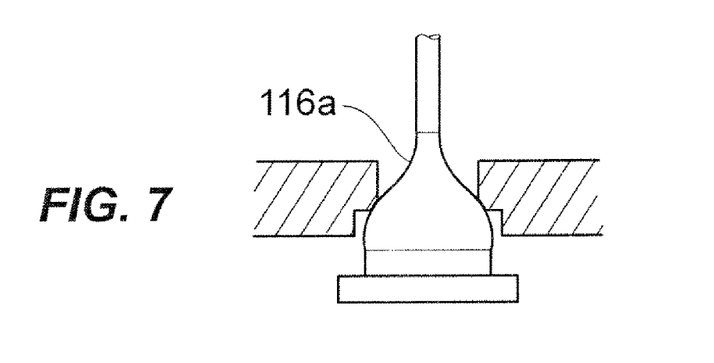
FIG. 7 shows an alternate construction of the supply valve of the first booster.
Figure 8:
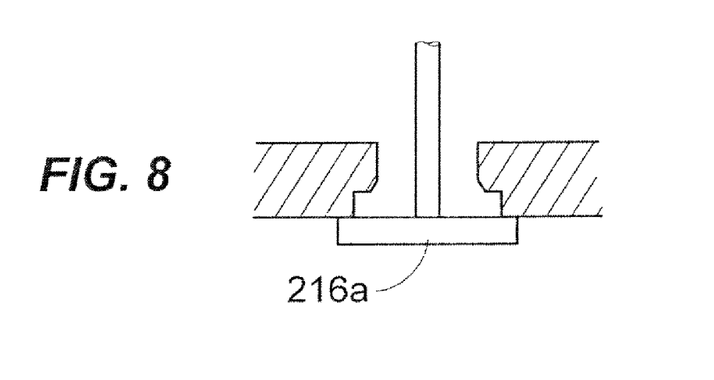
FIG. 8 shows an alternate construction of the supply valve of the second booster.

In a further method of manipulating the flow through the first booster 44, the construction of the supply valve 116 can be changed. The shape of the supply valve 116 as shown in FIG. 3 is that of a cone. Instead, as shown in FIG. 7, the supply valve 116a could take the shape of a bell to further restrict fluid flow rate through the supply port 106 at low amplitudes. In contrast, as shown in FIG. 8, the supply valve 216a of the second booster 48 could take the shape of a flat plate to increase the flow rate.

Figure 9:
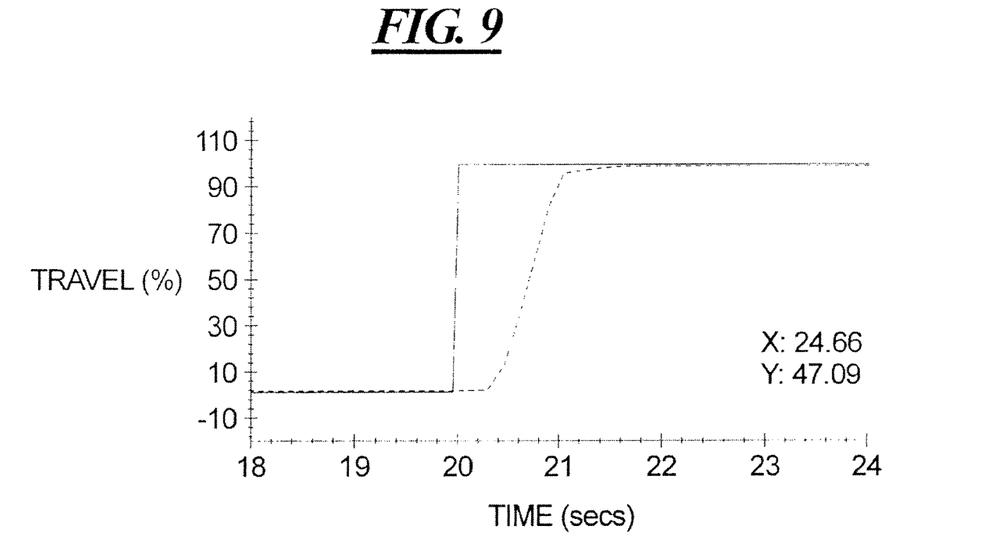
FIGS. 9 and 10 show a graph plotting actuator percent travel and theoretical actuator percent travel against elapsed time for a full stroke of the actuator in one example of a control valve system incorporating a volume booster arrangement constructed in accordance with the teachings of the present invention.
Figure 10:
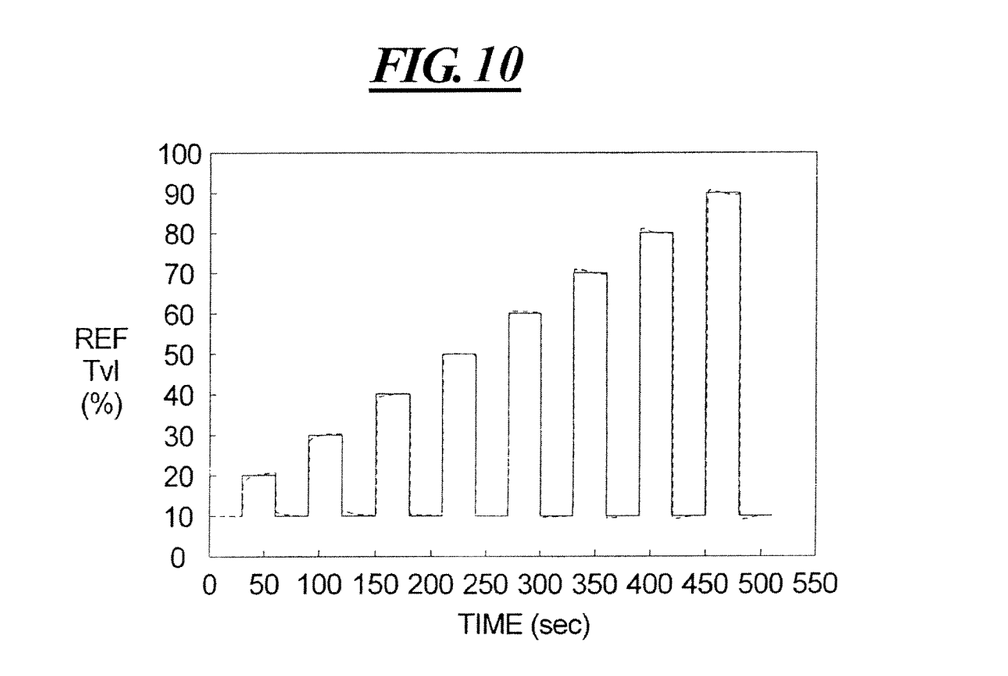

FIGS. 9 and 10 illustrate an example of a system and a system output that can be achieved by employing the asymmetric volume booster arrangement disclosed herein. The solid lines in each plot represent theoretically perfect symmetry. The dashed lines represent actual tested performance for different arrangements.

FIG. 9 illustrates an example of stroke speed for one stroke cycle in various booster/actuator/valve size combinations. In each plot, it can be seen that a 100% stroke can be achieved in about 1 and less than 2 seconds. Each test utilized a four volume booster arrangement with two volume boosters on each side of the actuator.

FIG. 10 illustrates that long stroke and reverse stroke cycles can be achieved with substantial dynamic symmetry utilizing the disclosed booster arrangement. The left axis of each plot represents percent of full stroke. The bottom axis of each plot represents elapsed time. These plots show long stroke and reverse stroke cycles and illustrate the substantial symmetry of the valve performance achieved using the described system 10.

Figure 11:
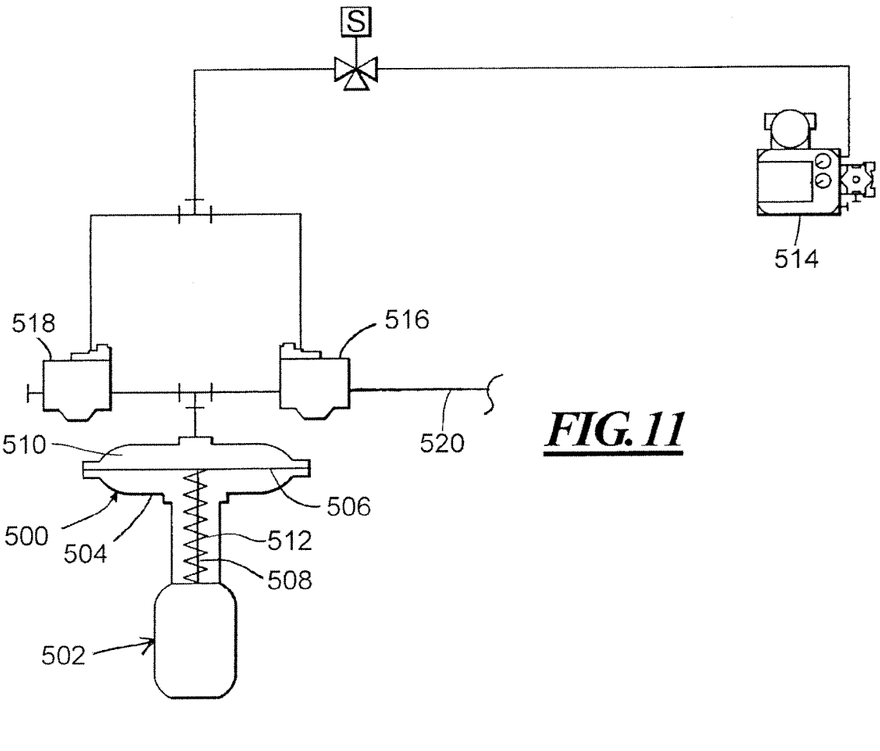
FIG. 11 shows a second example of an asymmetric assembly using a spring and diaphragm actuator.

FIG. 11 discloses another example in which an asymmetric design is used on a spring and diaphragm actuator 500. The actuator 500 is attached to a valve 502 similarly as in previous examples. The actuator includes a housing 504 in which a diaphragm 506 is disposed. The diaphragm 506 is connected to an actuator yoke 508, which is connected to the valve 502. The diaphragm 506 and the housing 504 define an upper chamber 510. Fluid pressure within the upper chamber 510 forces the diaphragm 506 and therefore the yoke 508 and valve 502 downward. When the fluid pressure in the upper chamber 510 is lowered, a spring 512 pushes the diaphragm 506 back upward. As can be seen, no air pressure is used to push the diaphragm 506 upward. Thus, an asymmetric response can be created in the performance of this actuator 500 by this construction alone.

In this example, a positioner 514 supplies fluid to a first booster 516 and a second booster 518 in parallel. The first and second boosters 516, 518 are in fluid connection to the upper chamber 510 of the actuator 500. Only the first booster 516 is connected to a pressurized fluid source through line 520 so that when the signal from the positioner 514 activates the boosters 516, 518, only the first booster 516 supplies highly pressurized fluid to the upper chamber 510 of the actuator 500. However, when the signal from the positioner 514 is lowered, the force of the spring 512 pushes the diaphragm 506 upward, and the pressurized fluid within the upper chamber 510 is exhausted through both the first and second boosters 516, 518. The fluid flow rates through the first and second boosters 516, 518 can be manipulated as described above, such as by enlarging or shrinking either the fluid supply path or the fluid exhaust path. In general, the fluid supply path is constricted relative to the fluid exhaust path. For example, the fluid supply path in the first booster 516 may have a supply constricted portion, and the first fluid exhaust path in the first booster and the second fluid exhaust path in the second booster may each have a first and second exhaust constricted portion. The supply constricted portion may have a smaller cross sectional area than the combined cross sectional areas of the first and second exhaust constricted portions. Other techniques outlined herein can also be used. In this manner, dynamic symmetry of performance can be achieved in a spring and diaphragm actuator 500.

The above-described details in the various Figures need not be mutually exclusive. That is, in accordance with the spirit and scope of the examples disclosed herein, one may pick and choose various aspects of the several Figures and combine those selected aspects with other selected aspects illustrated and described with respect to different Figures.

Numerous modifications and alternative embodiments of the invention will be apparent to those skilled in the art in view of the foregoing descriptions. Accordingly, these descriptions are to be construed as illustrative only and are for the purpose of teaching those skilled in the art the best mode or modes presently contemplated for carrying out the invention. The details of the structure or structures disclosed herein may be varied substantially without departing from the spirit of the invention, and the exclusive use of all modifications which come within the scope of the appended claims, either literally or under the doctrine of equivalents, is reserved.

The invention claimed is:

1. An asymmetric volume booster assembly, comprising:
    an actuator movable in a first direction and a second direction, the actuator including a piston inside of an actuator cylinder, the piston dividing the cylinder into a first chamber and a second chamber, a piston rod extending from the piston through the second chamber;
    a first booster in fluid communication with the first chamber of the actuator, the first booster including both a supply passage and an exhaust passage, wherein the supply passage supplies fluid to the first chamber of the actuator and the exhaust passage exhausts fluid from the first chamber of the actuator;
    a first supply valve disposed in the first booster for controlling fluid flow through the first booster and toward the first chamber of the actuator;
    a second booster in fluid communication with the second chamber of the actuator, the second booster including a supply passage and an exhaust passage, wherein the supply passage supplies fluid to the second chamber of the actuator and the exhaust passage exhausts fluid from the second chamber of the actuator;
    a second supply valve disposed in the second booster for controlling fluid flow through the second booster and toward the second chamber of the actuator;
    wherein the first supply valve has a higher fluid flow resistance than the second supply valve.

2. The assembly of claim 1, wherein the first exhaust passage and the second exhaust passage are sized and shaped such that the first exhaust passage has less resistance to fluid flow than the second exhaust passage.

3. An asymmetric volume booster assembly comprising:
    an actuator having a first side and a second side and movable in a first direction and a second direction, the actuator including a piston dividing the first side from the second side and a piston rod extending from the piston on the second side;
    a main fluid supply line operatively coupled to a regulator;
    a valve positioner in flow communication with the main fluid supply line and arranged to supply first and second pneumatic signals;
    a first volume booster in flow communication with the first side of the actuator and in flow communication with the main fluid supply line via a first booster supply line, the first volume booster including a supply passage, an exhaust passage, and a signal port, the supply passage arranged to route fluid to the first side of the actuator to move the actuator in the first direction in response to the first pneumatic signal received from the valve positioner via the signal port;
    a second volume booster in flow communication with the second side of the actuator and in flow communication with the main supply line via a second booster supply line, the second volume booster including a supply passage, an exhaust passage, and a signal port, the supply passage arranged to route fluid to the second side of the actuator to move the actuator in the second direction in response to the second pneumatic signal received from the valve positioner via the signal port; and the exhaust passage of the first volume booster having a first resistance to fluid flow, the exhaust passage of the second volume booster having a second resistance to fluid flow, the second resistance greater than the first resistance, wherein the supply passage of the first volume booster is identical to the supply passage of the second volume booster.

4. The assembly of claim 3, wherein the exhaust passage of the first volume booster includes a pair of chambers separated by an exhaust port configured to affect the first resistance, and the exhaust passage of the second volume booster includes a pair of chambers separated by an exhaust port configured to affect the second resistance.

5. The assembly of claim 4, wherein the exhaust port of the first volume booster has a larger cross-sectional area than a cross-sectional area of the second exhaust port.

6. The assembly of claim 4, wherein the exhaust port of the first volume booster is shorter than the exhaust port of the second volume booster.

7. The assembly of claim 3, wherein each of the first and second volume boosters includes an outlet vent and a poppet valve carrying a supply valve and an exhaust valve, the supply valve of the first and second volume boosters arranged to control flow from the main supply line toward the first and second side of the actuator, respectively, the exhaust valve of the first and second volume boosters arranged to control flow from the first and second side of the actuator, respectively, toward the outlet vent of the first and second volume boosters, respectively.

8. An asymmetric volume booster assembly comprising:

an actuator movable in a first direction and a second direction, the actuator having a first side and a second side divided by a piston, the piston including a piston rod extending from the second side of the actuator;

a main fluid supply line;

a valve positioner in flow communication with the main fluid supply line and arranged to supply first and second signals;

a first volume booster in flow communication with the first side of the actuator and in flow communication with the main fluid supply line via a first booster supply line, the first volume booster defining both a supply passage and an exhaust passage, the supply passage arranged to route fluid to a first side of the actuator to move the actuator in the first direction in response to the first signal received from the valve positioner;

a second volume booster in flow communication with the second side of the actuator and in flow communication with the main fluid supply line via a second booster supply line, the second volume booster defining both a supply passage and an exhaust passage, the supply passage arranged to route fluid to a second side of the actuator to move the actuator in the second direction in response to the second signal received from the valve positioner; and wherein the first and second volume boosters are functionally asymmetrical relative to one another, and wherein the functional asymmetry is achieved by at least one of:

arranging the exhaust passage of the first volume booster to have an exhaust fluid resistance less than an exhaust fluid resistance of the exhaust passage of the second volume booster and a supply passage of the first volume booster being identical to a supply passage of the second volume booster; or arranging the supply passage of the of the first volume booster to have a first supply mass flow rate less than a second supply mass flow rate of the supply passage of the second volume booster.

9. The assembly of claim 8, wherein the exhaust passage of the first volume booster includes a pair of chambers separated by an exhaust port configured to affect the first resistance, and the exhaust passage of the second volume booster includes a pair of chambers separated by an exhaust port configured to affect the second resistance.

10. The assembly of claim 8, wherein a supply port disposed in the supply passage of the first volume booster is configured to lower the first mass flow rate.

11. The assembly of claim 8, wherein a supply valve disposed in the supply passage of the first volume booster is configured to lower the first mass flow rate.

* * * * *

UNITED STATES PATENT AND TRADEMARK OFFICE
CERTIFICATE OF CORRECTION

Page 1 of 1

PATENT NO. : 7,845,268 B2
APPLICATION NO. : 12/180061
DATED : December 7, 2010
INVENTOR(S) : Kenneth W. Junk It is certified that error appears in the above-identified patent and that said Letters Patent is hereby corrected as shown below:

On the Title Page:

Add Item -- (63) This patent is a continuation of application No. 11/107,073, filed Apr. 15, 2005. --.

Add Item -- (60) Provisional application No. 60/562,905, filed Apr. 16, 2004. --.

In the Specification:

At Column 4, line 43, "acutuator" should be -- actuator --.

Signed and Sealed this
Fifteenth Day of March, 2011

David J. Kappos
*Director of the United States Patent and Trademark Office*